UNITED STATES PATENT OFFICE.

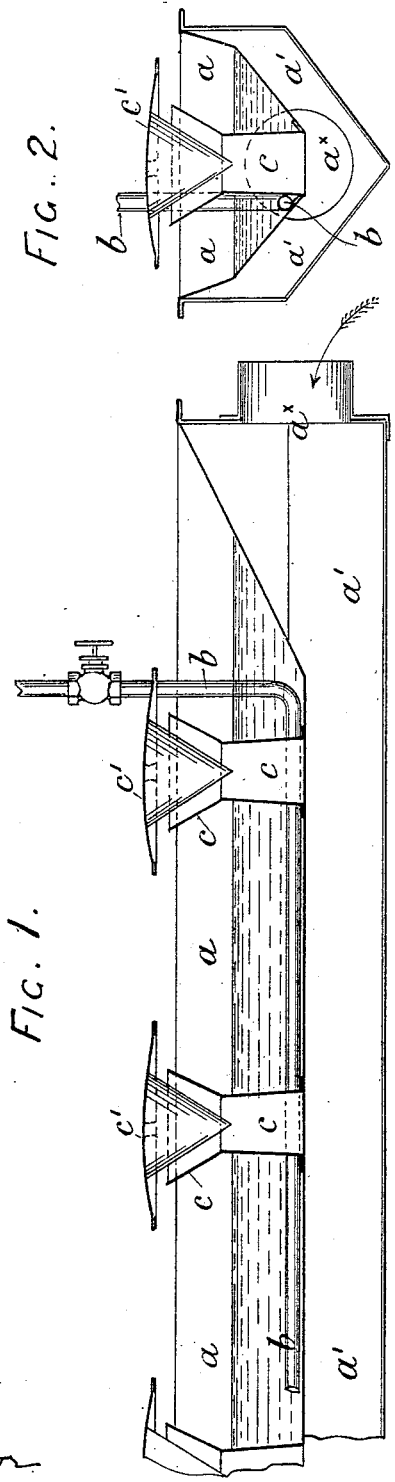

DANIEL HALL AND JAMES HENRY KAY, OF ASHTON-UNDER-LYNE, ENGLAND.

MEANS FOR HUMIDIFYING AIR.

SPECIFICATION forming part of Letters Patent No. 602,745, dated April 19, 1898.

Application filed February 16, 1897. Serial No. 623,659. (No model.) Patented in England February 3, 1896, No. 2,403.

*To all whom it may concern:*

Be it known that we, DANIEL HALL and JAMES HENRY KAY, subjects of the Queen of Great Britain, residing at Ashton-under-Lyne, in the county of Lancaster, England, have invented new and useful Improved Means for Humidifying Air, (for which we have obtained Letters Patent in Great Britain, No. 2,403, dated February 3, 1896,) of which the following is a specification.

This invention relates to means for humidifying the air of spinning-rooms and other places where a moist atmosphere is desirable, the object of our invention being to moisten the air in a natural manner and not excessively.

Our invention will be readily understood from the following description on reference to the accompanying drawings.

Figure 1 is a longitudinal section, and Fig. 2 a transverse section, through one of our improved appliances for humidifying.

We use a trough $a$ (or a series of such water-troughs) at a suitable height in the spinning-room or other place where moist air is required, and we heat the water in each trough by a steam-pipe $b$ or pipes or otherwise; but according to our invention we provide the trough $a$ or troughs with an air space or jacket $a'$ at sides and bottom, and at intervals along the trough $a$ we form air-outlets $c$, preferably in the form of inverted cones, as shown, communicating with the said air-jacket $a'$ and admitting air therefrom into the room. These conical outlets $c$ may pass through the water in the trough $a$, their broad open ends being above the water-level, as shown, and above the open ends of these air-outlets $c$ we fix a deflecting-plate $c'$ to spread the air and cause it to mix with the steam or vapor arising from the heated water in the trough $a$. The air passing along the outside of the trough $a$ in the jacket $a'$ is or may be supplied by a suitable fan (not shown on the drawings) to the inlet $a^x$, and the said air will prevent too great radiation of heat from the said trough and consequent overheating of the atmosphere in the room or place in which the trough is fixed, and the air thus issuing directly into the room or place will be warm and will not cause the steam or vapor from the trough to condense, but will ventilate the said room or place and keep it fresh and sufficiently cool without draft. Furthermore, the air in the room or space will be kept equally moistened at every part thereof.

We are aware that a water-trough has been used in combination with a steam-pipe and air-outlets and deflecting-plates to moisten air in a casing from which the said air escapes or is delivered into a room, and we do not, therefore, make claim to such an apparatus, as the moistened air cannot spread thereby equally in all parts of the room; but We do claim as our invention—

The combination of a trough for containing water, with a suitable heater for the water, an air casing or jacket through which a current of air is passed, air-outlets therefrom, opening just above the water-level in the trough, and deflecting-plates above the air-outlet and above the sides of the trough, whereby the air is caused to spread and mix with the steam or vapor arising from the heated water in the trough and is discharged in all directions directly into the room.

In testimony whereof we have signed our names to this specification in the presence of two subscribing witnesses.

DANIEL HALL.
JAMES HENRY KAY.

Witnesses:
CHARLES A. DAVIES,
JNO. HUGHES.